United States Patent [19]

Muller

[11] Patent Number: 4,731,728

[45] Date of Patent: Mar. 15, 1988

[54] POSTAGE METER WITH MEANS FOR PREVENTING UNAUTHORIZED POSTAGE PRINTING

[75] Inventor: Arno Muller, Westport, Conn.

[73] Assignee: Pitney Bowes Inc., Stamford, Conn.

[21] Appl. No.: 690,355

[22] Filed: Jan. 10, 1985

[51] Int. Cl.[4] .......... G06F 15/20; H01H 9/00

[52] U.S. Cl. .......... 364/466; 101/91; 361/160; 361/194; 364/464; 364/900

[58] Field of Search .......... 364/200, 900, 519, 464, 364/466; 340/545, 680, 825, 36; 101/45, 91; 361/160, 194, 139

[56] References Cited

U.S. PATENT DOCUMENTS

| | | | |
|---|---|---|---|
| 3,264,528 | 8/1966 | Leifer | 361/140 |
| 3,579,052 | 5/1971 | Kato | 361/194 |
| 3,582,981 | 6/1971 | Dalyai | 361/194 |
| 3,851,216 | 11/1974 | Clarke et al. | 361/160 |
| 4,253,015 | 2/1981 | McFiggans et al. | 377/32 |
| 4,283,721 | 8/1981 | Eckert et al. | 340/545 |
| 4,301,507 | 11/1981 | Soderberg et al. | 364/900 |
| 4,421,023 | 12/1983 | Kittredge | 101/91 |
| 4,525,785 | 6/1985 | Soderberg et al. | 364/464 |
| 4,547,853 | 10/1985 | Eckert | 364/564 |

OTHER PUBLICATIONS

Electronic Devices & Circuit Theory, R. Boylestad et al, Prentice-Hall Publishing (1978), pp. 324–329.

*Primary Examiner*—Errol A. Krass
*Assistant Examiner*—Kevin J. Teska
*Attorney, Agent, or Firm*—Michael J. DeSha; David E. Pitchenik; Melvin J. Scolnick

[57] ABSTRACT

An electronic postage meter which has a computer and apparatus for printing a postage value, wherein the computer includes instrumentalities for authorizing printing the postage value, and has shutter apparatus which is operable for alternately preventing and permitting operation of the postage printing apparatus, and has interposing apparatus which is operable for alternately preventing and permitting operation of the shutter apparatus, is provided with an improvement for controlling the operation of the interposing apparatus. The improvement comprises: providing the computer with the means for generating a first control signal for normally operating the interposing apparatus to prevent operation of the shutter apparatus; providing the computer with the means for generating a second periodically pulsing control signal, when the accounting instrumentalities have authorized printing the postage value, for operating the interposing apparatus to permit operation of the shutter apparatus; and coupling the first and second control signals to the interposing apparatus for controlling its operation.

13 Claims, 7 Drawing Figures

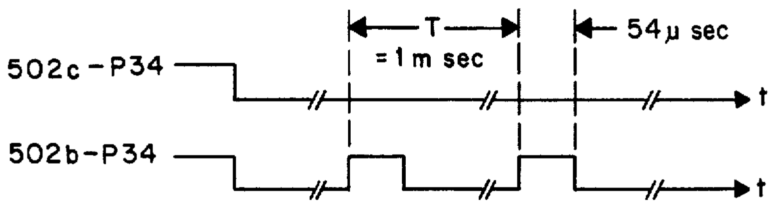
FIG. 5
FIG. 6a
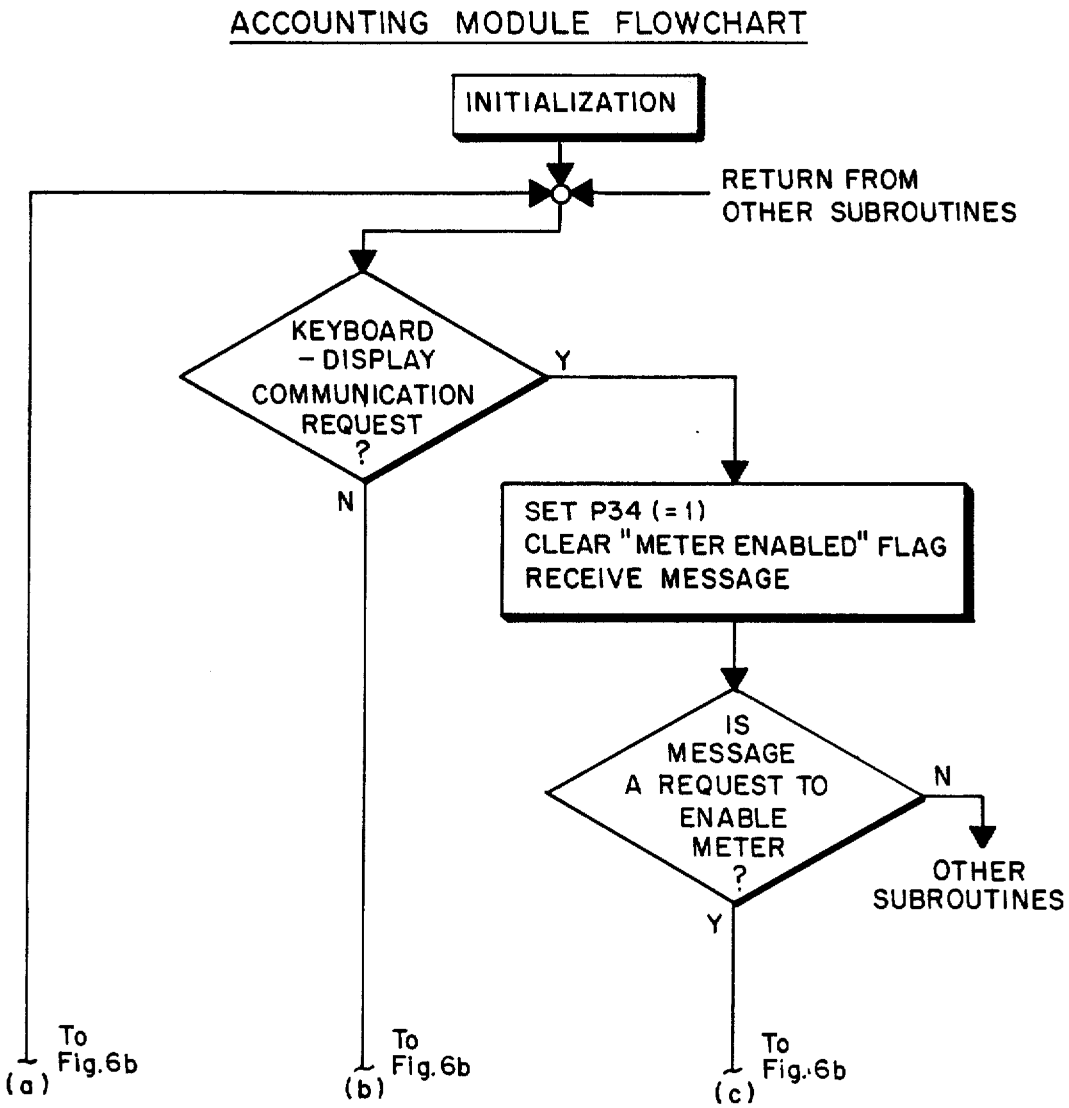

POSTAGE METER WITH MEANS FOR PREVENTING UNAUTHORIZED POSTAGE PRINTING

BACKGROUND OF THE INVENTION

This invention relates to electronic postage meters, and more particularly to the provision of means for preventing the postage meter from printing a selected postage value until authorization has been given to do so in response to the occurrence of one or more predetermined events, including for example, until a determination is made that a selected postage value is available for printing and the accounting amounts stored in the meter have been changed to reflect printing the selected postage value.

As shown in U.S. Pat. No. 4,266,222 issued May 5, 1981 to A. B. Eckert, et al and assigned to the assignee of the present invention, electronic postage meters have been provided with microcomputer systems which include a keyboard and display unit for selecting and entering postage values to be printed, an accounting unit for incrementing the postage used amount and decrementing the postage unused amount and changing the control sum amount stored in meter prior to printing the entered postage value, and a printing unit for printing the entered postage values. Such meters have been provided with an electronic control system for holding an interposer in blocking relationship with respect to a shutter bar to prevent removal of the shutter bar from a keyway formed in the postage meter's drum drive gear, to thereby prevent the entered postage from being printed by the drum until the completion of the function of accounting for the postage value which is to be printed. In the aforesaid U.S. Pat. No. 4,266,222, although the electronic control system requires the coincidence of signals from both the accounting and printing units for causing the interposer to be moved out of blocking relationship with the shutter bar, there have been instances when unaccounted for postage has been printed due to faulty microprocessor operation having inadvertently and prematurely provided the coincident signals required for such movement of the interposer. Accordingly An object of the invention is to provide an electronic postage meter including a fault tolerant electronic control system for preventing unauthorized printing of postage values;

Another object is to provide an electronic postage meter with improved means for controlling the operation of the interposing apparatus; and Another object is to provide an electronic postage meter including a periodically pulsing control signal and an amplifier driven thereby for controlling operation of the interposer.

SUMMARY OF THE INVENTION

In an electronic postage meter having computer means and means for printing a postage value, wherein the computer means includes means for authorizing printing the postage value, and having shutter means operable for alternately preventing and permitting operation of said postage printing means, and having interposing means operable for alternately preventing and permitting operation of said shutter means, an improvement for controlling operation of said interposing means, said improvement comprising: said computer means including means for generating a first control signal for normally operating said interposing means to prevent operation of said shutter means; said computer means including means for generating a second control signal when said authorizing means has authorized printing the postage value; said second control signal being a periodically pulsing signal for operating said interposing means to permit operation of said shutter means; and means for coupling said first and second control signals to said interposing means for controlling operation thereof.

BRIEF DESCRIPTION OF THE DRAWINGS

As shown in the drawings wherein like reference numerals designate like or corresponding parts throughout the several figures:

FIG. 5 shows the control signals according to the invention; and

DESCRIPTION OF THE PREFERRED EMBODIMENTS

Figure 1:
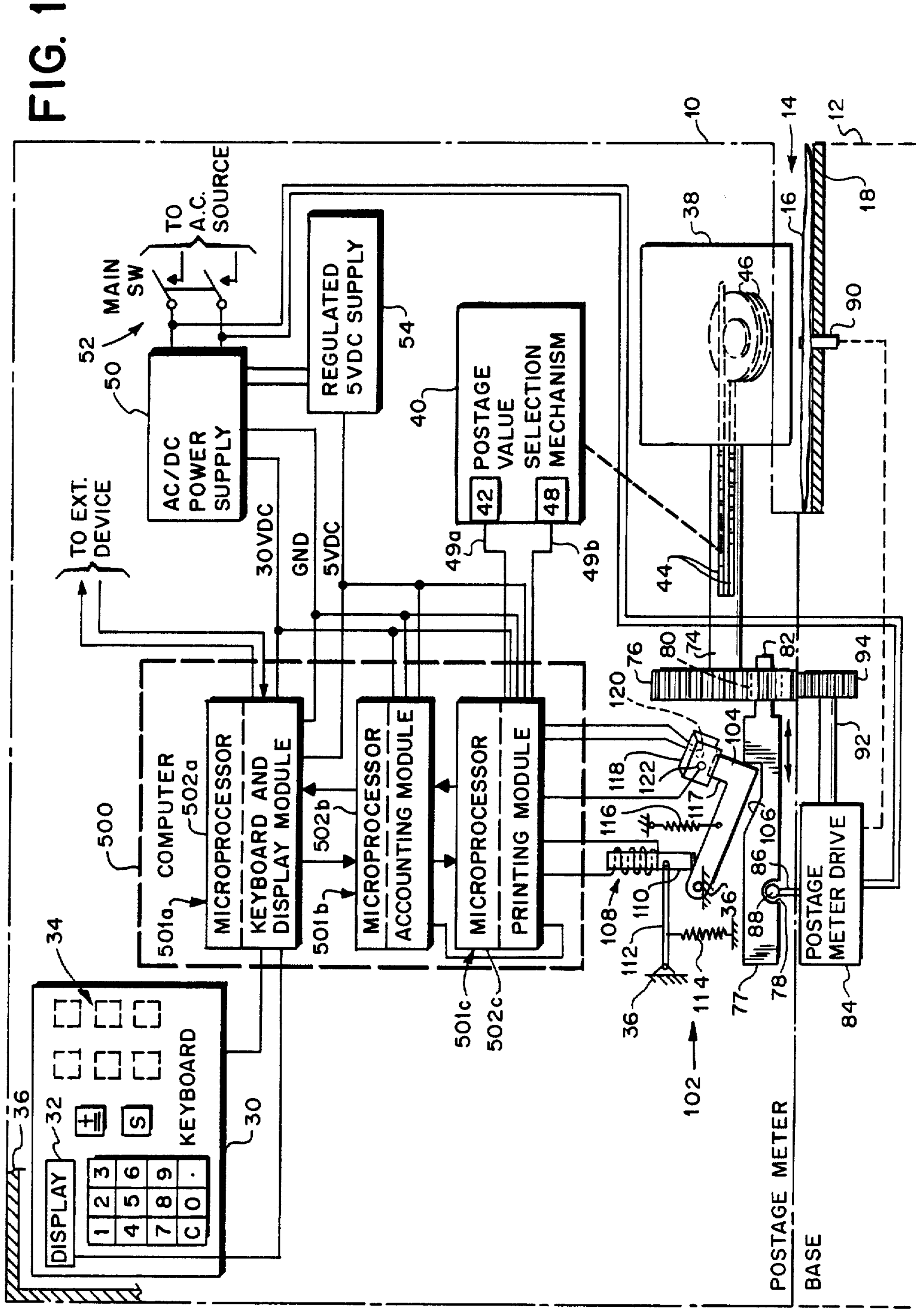
FIG. 1 is a schematic diagram of an electronic postage meter in which the apparatus according to the invention may be included.

As shown in FIG. 1, the apparatus in which the invention may be incorporated generally includes an electronic postage meter 10 which is suitably removably mounted on a conventional base 12, so as to form therewith a slot 14 into which sheets 16, including mailpieces, such as envelopes, cards or other sheet-like materials, may be inserted for disposition on a platen 18 connected to the base 12.

The postage meter 10 (FIG. 1) includes a keyboard 30 and display 32. The keyboard 30 includes a plurality of numeric keys, labeled 0–9 inclusive, a clear key, labeled "c" and a decimal point key, labeled ".", for selecting postage values to be entered; a set postage key, labeled "s", for entering selected postage values; and an arithmetic function key, labeled "±", for adding subsequently selected charges (such as special delivery costs) to a previously selected postage value before entry of the total value. In addition, there is provided a plurality of display keys, designated 34, each of which is provided with labels well known in the art for identifying information stored in the meter 10 and shown on the display 32 in response to depression of the particular key 34, such as the "postage used", "postage unused", "control sum", "piece count", "batch value" and "batch count" values. A more detailed description of the keys of the keyboard 30 and the display 32, and their respective functions may be found in U.S. Pat. No. 4,283,721 issued Aug. 11, 1981 to Eckert, et al. and assigned to the assignee of the present invention.

In addition, the meter 10 (FIG. 1) includes a frame 36, on which the keyboard 30 and display 32 are conventionally mounted, and which is adapted by well known means for carrying a cyclically operable, rotary, postage printing drum 38. The drum 38 is conventionally constructed and arranged for feeding the respective sheet 16 in a path of travel which extends beneath the drum 38, and for printing entered postage on the upwardly disposed surface of each sheets 16. For postage value selecting purposes, the meter 10 also includes a conventional postage value selection mechanism 40, for example, of the type shown in U.S. Pat. No. 4,287,825 issued Sept. 8, 1981 to Eckert, et al. and assigned to the assignee of the present invention. The mechanism 40 which is operably electrically coupled via the postage meter's computer 500 to the keyboard 30 and display 32, includes a first stepper motor 42 for selecting any one of a plurality of racks 44, associated on a one for one basis with each of the print wheels 46, and a second stepper motor 48 for actuating each selected rack 44 for positioning the appropriate printing element of the associated print wheel 46. The rack selection stepper motor 42, which is referred to by skilled artisans as a bank selector motor, is conventionally energized via a power line 49a from the computer 500 for selecting the appropriate rack 44; and the rack actuating stepper motor 48, which is referred to by skilled artisans as a digit selector motor, is conventionally energized via a power line 49b from the computer 500 to move the selected rack 44 for selecting the appropriate digit element of the associated print wheel 46. A more detailed description of the value selection mechanism 40 may be found in the aforesaid U.S. Pat. No. 4,287,825.

The computer 500 (FIG. 1) for the postage meter 10 generally comprises a conventional, microcomputer system having a plurality of microcomputer modules including a control or keyboard and display module, 501a, an accounting module 501b and a printing module 501c. The control module 501a is both operably electrically connected to the accounting module 501b and adapted to be operably electrically connected to an external device via respective two-way serial communications channels, and the accounting module 501b is operably electrically connected to the printing module 501c via a corresponding two-way serial communication channel. In general, each of the modules 501a, 501b and 501c includes a dedicated microprocessor 502a, 502b or 502c, respectively, having a separately controlled clock and programs. And two-way communications are conducted via the respective serial communication channels utilizing the echoplex communication discipline, wherein communications are in the form of serially transmitted single byte header-only messages, consisting of ten bits including a start bit followed by an 8 bit byte which is in turn followed by a stop bit, or in the form of a multi-byte message consisting of a header and one or more additional bytes of information. Further, all transmitted messages are followed by a no error pulse if the message was received error free. In operation, each of the modules 501a, 501b and 501c is capable of processing data independently and asynchronously of the other. In addition, to allow for compatibility between the postage meter 10 and any external apparatus, all operational data transmitted to, from and between each of the three modules 501a, 501b and 501c, and all stored operator information, is accessible to the external device via the two-way communication channel, as a result of which the external apparatus (if any) may be adapted to have complete control of the postage meter 10 as well as access to all current operational information in the postage meter 10. In addition, the flow of messages to, from and between the three internal modules 501a, 501b and 501c is in a predetermined, hierarchical direction. For example, any command message from the control module 501a is communicated to the accounting module 501b, where it is processed either for local action in the accounting module 501b and/or as a command message for the printing module 501c. On the other hand, any message from the printing module 501c is communicated to the accounting module 501b where it is either used as internal information or merged with additional data and communicated to the control module 501c. And, any message from the accounting module 501b is initially directed to the printing module 501c or to the control module 501a. A more detailed description of the various prior art modules 501a, 501b and 501c, and various modifications thereof, may be found in U.S. Pat. Nos. 4,280,180; 4,280,179; 4,283,721 and 4,301,507; each of which patents is assigned to the assignee of the present invention.

The postage meter 10 (FIG. 1) includes an AC/DC power supply 50 which is adapted to be connected to a local source of supply of A.C. power via a normally open main power switch 52 which may be closed by the operator. Upon such closure, the postage meter AC/DC power supply 50, and regulated 5 V DC power supply 54, are energized for supplying each of the modules 501a, 501b and 501c with local 5 volt and 30 volt D.C. sources. The postage meter 10 additionally includes a conventional, rotatably mounted, shaft 74 on which the drum 38 is fixedly mounted, a conventional drive gear 76, which is fixedly attached to the shaft 74 for rotation of the shaft 74, and a conventional, suitably reciprocally mounted, shutter bar 77 which has a bearing cavity 78. The drive gear 76 has an aperture 80 which is formed therein to receive the adjacently disposed end 82 of the shutter bar 77. For reciprocally moving the shutter bar 77, the base 12 includes a conventional postage meter drive unit 84 including means for actuating the shutter bar 77, such as a pivotally mounted shutter bar driving lever 86 having a free end 88 which is configured for disposition in bearing engagement with the shutter bar's bearing cavity 78. The drive unit 84 is suitably operably connected to the lever 86 for timely withdrawing the shutter bar 77 from the aperture 80 in response to a sheet 16 engaging a trip lever 90 which is conventionally operatively connected to the drive unit 84. The trip lever 90 extends into the slot 14 for sensing the insertion of a sheet 16 into the slot 14. When the trip lever 90 is engaged by a sheet 16, the drive unit 84 causes the lever 86 to timely withdraw the shutter bar 77 from the drum drive gear 76 to permit rotation of the same, and thereafter timely drives the shaft 92, and thus the drive gear 94 attached to the drum shaft 92 and the drive gear 76 through one revolution. Whereupon the selected postage value is printed on the sheet 16 by the drum 38 as the drum 38 feeds the sheet 16 from the platen 18. The drive unit 84 thereafter conventionally timely pivots the lever 86 for resetting the shutter bar 77 into the aperture 80 of the drum drive gear 76. Thus the drive unit 84 normally responds to actuation of the trip lever 90 by withdrawing the shutter bar 77 from the gear 76, driving the drum 38 through a single revolution, and then resetting the shutter bar 77 in the drum drive gear 76 to prevent further rotation of the drum 38 until the trip lever 90 is again actuated.

To permit the postage meter 10 (FIG. 1) to prevent withdrawal of the shutter bar 77 by the base 12 until the postage meter 10 is prepared to print postage, the postage meter 10 includes interposing apparatus 102 which normally disables withdrawal of the shutter bar 77 from the drum drive gear 76. The interposing apparatus 102 includes a bail 104, known in the art as the interposer, which has one end pivotably attached to the frame 36 of the postage meter 10 and the other end normally disposed in a cavity 106 formed in the shutter bar 77. In addition, the interposing apparatus 102 includes a conventional solenoid 108 which is responsive to energization from the computer 500 for lifting the solenoid's core 110 out of engagement with the bail 104. For maintaining the bail 104 in the place within the shutter bar's cavity 106, the interposing apparatus includes an arm 112, which has one end pivotably attached to the frame 36 of the postage meter 10 and the other end pivotably attached to the solenoid's core 110, and a first spring 114, which has one end anchored to the frame 36 of the postage meter 10 and the other end connected to the arm 112. The first spring 114 urges the arm 112 in a direction tending to urge the solenoid core 110 into engagement with the bail 104 for seating the solenoid core 110 on the bail 104 and holding the bail 104 in place within the shutter bar's cavity 106 against the force exerted on the bail 104 by a second spring 116. When disposed within the cavity 106, the bail 104 is disposed in engagement with the shutter bar 77 so as to block withdrawal of the shutter bar 77 from the drive gear 76. Upon energization of the solenoid 108 by the computer 500, the solenoid core 110 is raised. Whereupon the second spring 116 lifts the bail 104 out of the cavity 106 against the force exerted on the solenoid core 110 by the first spring 114.

For sensing the position of the bail 104 (FIG. 1) the end of the bail 104 which is normally disposed within the cavity 106 includes a projection 117. And the postage meter 10 includes a conventional, optical-electrical sensing device 118 which is suitably attached to the frame 36 of the postage meter 10. The sensing device 118 includes a light emitting diode (LED) 120 which is suitably electrically connected to the computer 500 for controlling energization thereof. In addition, the sensing device 118 includes a light responsive sensor 122 which is conventionally electrically connected to the computer 500 for providing a high or low level output signal to the computer 500, depending, respectively on whether light from the LED 120 is or is not being blocked by the interposer's projection 117. Thus, when the projection 117 is disposed between the LED 120 and sensor 122, the signal to the computer 500 from the sensor 122 is indicative that the bail 104 is disposed out of blocking relationship with respect to the shutter bar 77; whereas when the projection 117 is not disposed between the LED 120 and sensor 122 the signal to the computer 500 from the sensor 122 is indicative that the bail 104 is disposed in blocking relationship with respect to the shutter bar 77.

Figure 2:
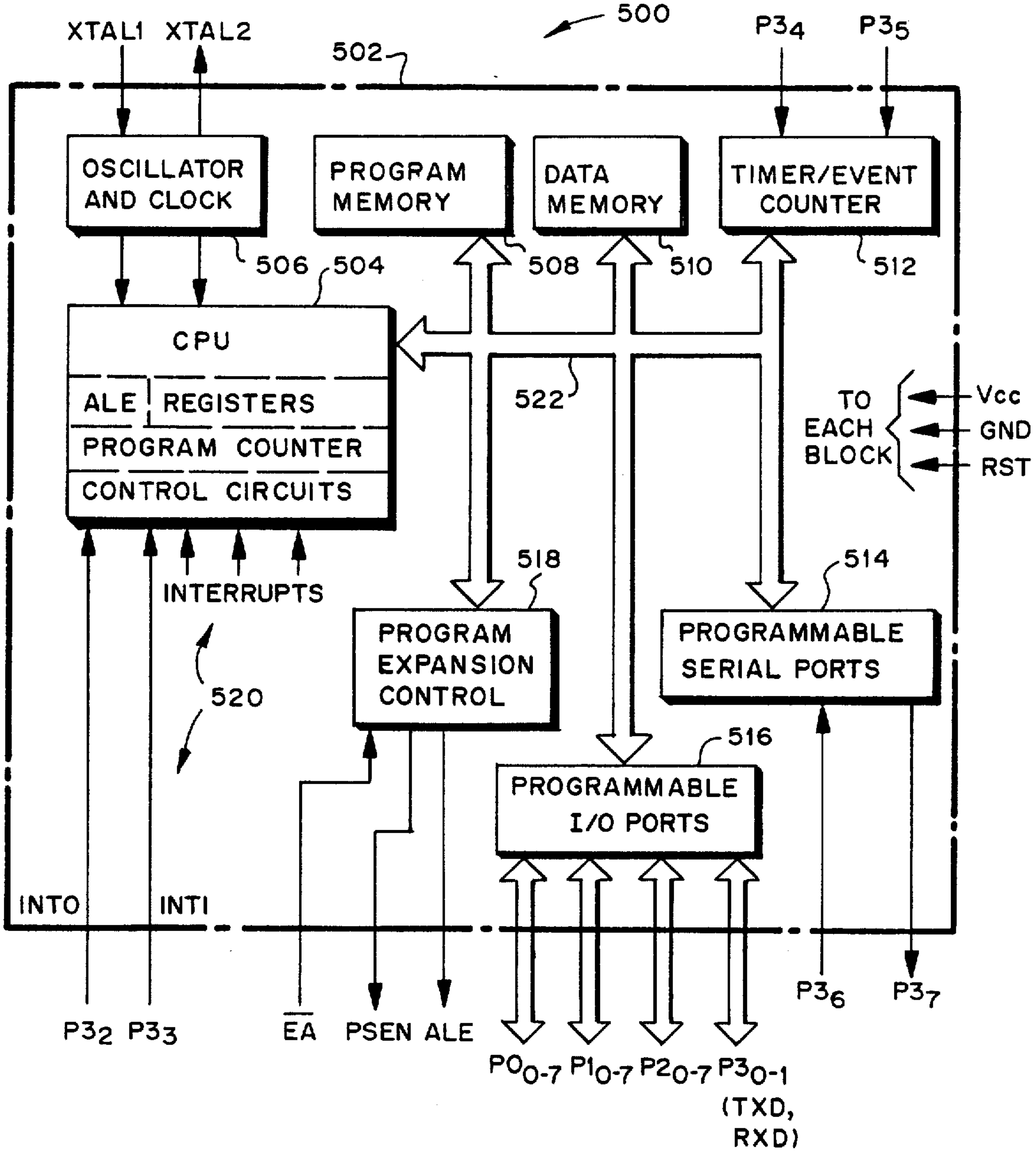
FIG. 2 is a microprocessor of the type which may be utilized for controlling the apparatus according to the invention.

As shown in FIG. 1 the computer 500 includes separate microprocessors **502*a*, 502*b* and 502*c*. Preferably each of these microprocessors, i.e., 502 (FIG. 2), is a conventional, inexpensively commercially available, high speed microprocessor, such as the Model 8051 single chip microprocessor commercially available from Intel Corporation, 3065 Bowers Avenue, Santa Clara, Calif. 95051. The microprocessor 502, generally able from Intel Corporation, 3065 Bowers Avenue, Santa Clara, California 95051. The microprocessor 502, generally comprises a plurality of discrete circuits, including those of a control processor unit or CPU 504, an oscillator and clock 506, a program memory 508, a data memory 510, timer and event counters 512, programmable serial ports 514, programmable I/O ports 516 and control circuits 518, which are respectively constructed and arranged by well known means for executing instructions from the program memory 508 that pertain to internal data, data from the clock 506, data memory 510, timer and event counter 512, serial ports 514, I/O ports 514 interrupts 520 and/or bus 522 and providing appropriate outputs from the clock 506, serial ports 514, I/O ports 516 and timer 512. A more detailed discussion of the internal structural and functional characteristics and features of the Model 8051 microprocessor, including optional methods of programming port 3** for use as a conventional bi-directional port, may be found in the Intel Corporation publication entitled MCS-51 Family of Single Chip Microcomputers Users Manual, dated Jan. 1981.

Figure 3:
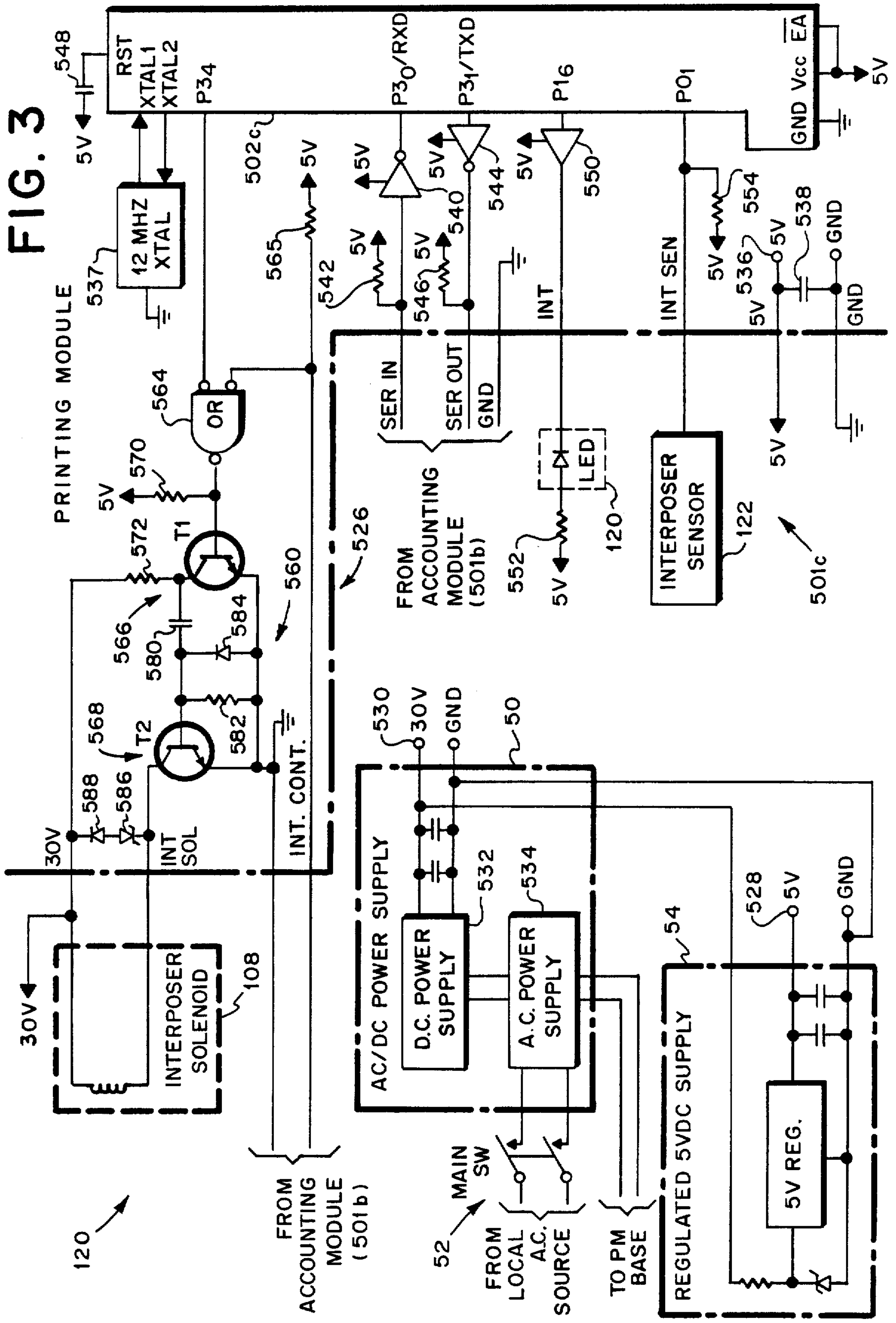
FIG. 3 is a circuit diagram of a printing module including apparatus according to the invention.

As shown in FIG. 3, to facilitate maintenance of the printing module **501*c*, the module's logic components may be mounted on a separate printed circuit board which is removably interconnected with the postage meter's analog components by means of a conventional connector located along the dot-dash line 526. Apart from the printing module 501*c*, the postage meter 10 includes a 5 volt source 528 and associated ground return lead GND from the meter's regulated 5 V D.C. power supply 54, and a 30 volt source 530 and associated ground return lead GND from the meter's 30 volt D.C. supply 532. In addition, the postage meter's AC/DC power supply 50 includes an A.C. supply 534 which is suitably adapted to be conventionally electrically connected, via the main power switch 52, for energization from a local A.C. power source and is suitably connected to the 30 volt D.C. supply 532**.

To provide the printing module **501*c* with a local 5 V D.C. source 536 and associated ground return GND, the module 501*c* preferably includes 5 V and GND leads extending therefrom for conventional connection to the 5 volt source 528 and associated ground return GND discussed above. Preferably, within the module 501*c* the 5 V D.C. source 536 is shunted to the associated ground return lead GND by a suitable filter capacitor 538**.

Serial input communications to the printing module **501*c* (FIG. 3) are received from the accounting module 501*b* via the serial input lead, which is preferably operably coupled to port $P3_0$ of the microprocessor 502*c* by means of a conventional inverting buffer circuit 540. Accordingly, port $P3_0$ is programmed for serial input communications, and the input to the buffer circuit 540 is resistively coupled to the module's local 5 V D.C. source 536 via a conventional pull-up resistor 542. Serial output communications from the microprocessor 502*c* are preferably transmitted from port $P3_1$. Accordingly, port $P3_1$ is programmed for serial output communications, and is operably coupled to the input of a conventional inverting buffer 544, the output of which is resistively coupled to the 5 V D.C. source 536 via a suitable pull-up resistor 546 and is additionally electrically connected to the serial communications output lead from the printing module 501*c*. In addition, the module 501*c*** includes an associated serial communications ground lead GND which is connected to the module's local ground return.

Since it is preferable that the microprocessor **502*c* be reset in response to energization of the postage meter 10, the reset pin, RST, of the microprocessor 502*c* is conventionally coupled to the module's local 5 V D.C. source 536 via a suitable capacitor 548. In addition, the VCC and VSS terminals of the microprocessor 501*c* are respectively conventionally connected to the module's 5 V D.C. source 536 and associated ground return lead GND. And, since the microprocessor 502***c* does not utilize an external program memory, the $\overline{EA}$ terminal is conventionally connected to the module's 5 V D.C. source 536. In addition, the microprocessor 502*c* is preferably equipped with a conventional 12 MHz crystal circuit 537 which is conventionally connected to the microprocessor's XTAL1 and XTAL2 terminals.

For communicating with the postage meter's interposer sensing device 118, port $P1_6$ is utilized for energizing the sensing device's LED 120 and port $P0_1$ is utilized for receiving input signals from the sensing device's sensor 122. To that end, port $P1_6$ is suitably connected to the input of a conventional buffer 550, the output of which is electrically connected via the module's interposer output lead to the cathode of the LED 120 which has its anode conventionally connected to the postage meter's 5 V D.C. source 528 via a suitable resistor 552. Preferably, port $P1_6$ is conventionally programmed for providing a pulsing output signal for intermittently lighting the LED 120, with a view to extending the life of the LED 120. In addition, port $P0_1$ of the microprocessor 501*c* is conventionally electrically connected to the module's local 5 V D.C. source 536 via a conventional pull-up resistor 554 and is also suitably electrically connected to the output of the interposer sensor 122.

According to the invention, to provide for fail-safe operation of the interposing apparatus 102 the printing module 501*c* includes a pulse controlled interposer solenoid operating circuit 560. The circuit 560 generally comprises a two stage pulse controlled amplifier circuit having its input operably coupled to ports $P3_4$ of both of the microprocessors 502*b* and 502*c* by means of a conventional OR gate 564. The input connected to port $P3_4$ of thė microprocessor 501*b*, which is additionally connected via a conventional pull-up resistor 565 of the printing module's local 5 V source 536, will hereinafter be discussed in greater detail. Preferably, the OR gate 564 has an open collector configuration, as a result of which the output of the OR gate 564 floats when the gate 564 is in its true or turned-off state and is grounded when the gate 564 is in its false or turned-on state. The two stage amplifier circuit 560 includes a first stage amplifier circuit 566 which is capacitively coupled to a second stage amplifier circuit 568. The output from OR gate 564, which is conventionally connected via a suitable pull-up resistor 570 to the module's 5 V D.C. source 536, is coupled to the base of transistor T1 of the first stage amplifier circuit 566. The collector of transistor T1 is connected via a suitable load resistor 572 to the postage meter's 30 volt D.C. source 530, whereas the emitter of transistor T1 is connected to the module's local ground return lead GND. The second stage amplifier circuit 568 includes a transistor T2 having its base coupled to the collector of transistor T1 by means of a capacitor 580. The base of transistor T2 is also connected by means of a parallel circuit, including a base current leakage resistor 582 and an appropriately poled diode 584, to the module's local ground return lead GND. The collector of transistor T2 is connected to the low voltage side of the interposer's solenoid 108 via the module's interposer solenoid output lead. The high voltage side of the solenoid 108 is connected to the postage meter's 30 volt D.C. source 530. To provide a discharge path for current flow from the interposer solenoid 108, the collector of transistor T2 is connected to the cathode of a zener diode 586 having its anode connected to the anode of a conventional diode 588 which, in turn, has its cathode connected via the module's 30 volt output lead to the postage meter's 30 volt D.C. source 530. In addition, the emitter of transistor T2 is connected to the module's local ground return lead GND, and to a ground lead GND associated with the interposer output lead.

Figure 4:
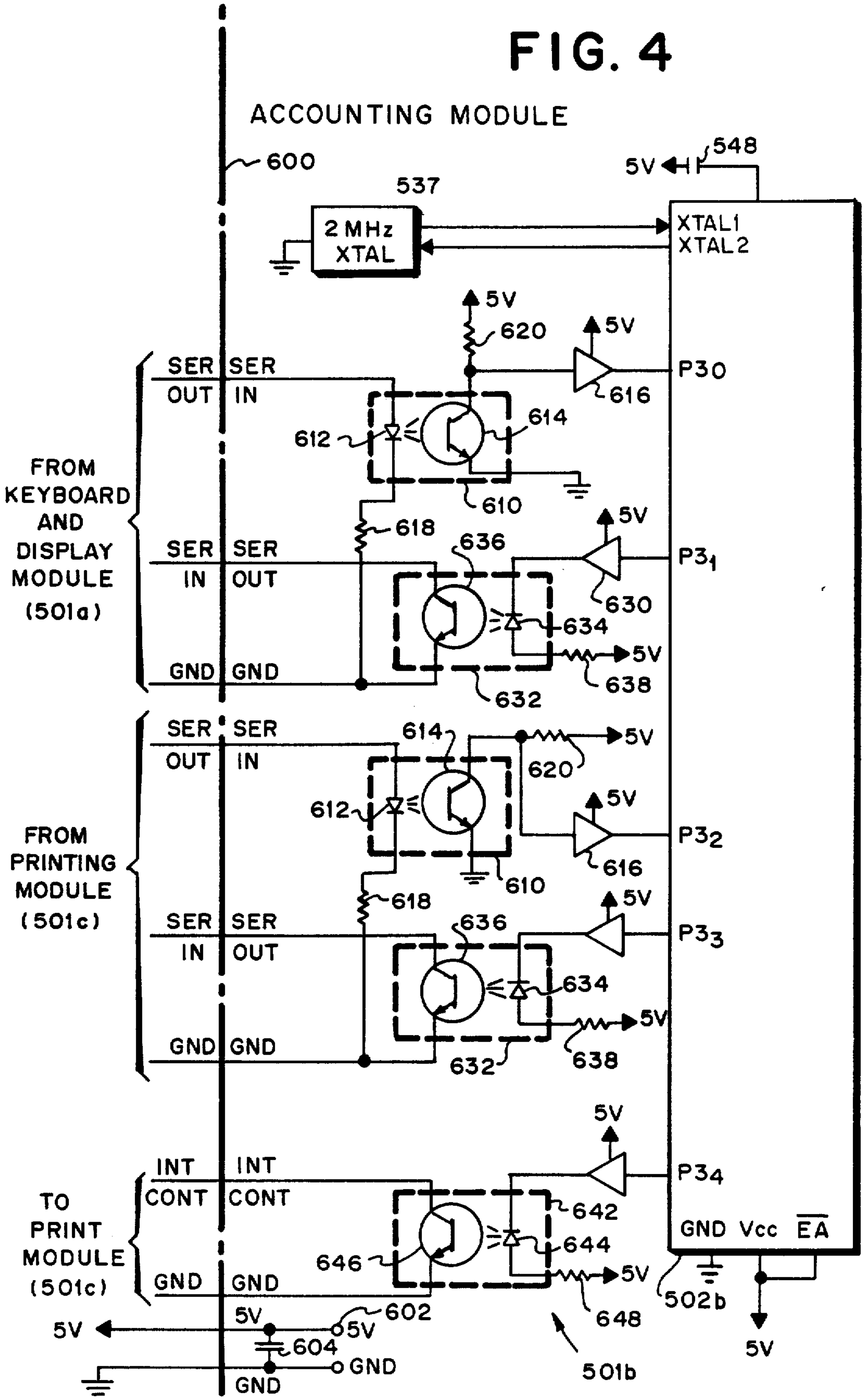
FIG. 4 is a circuit diagram of an accounting module including apparatus according to the invention.
Figure 6B:
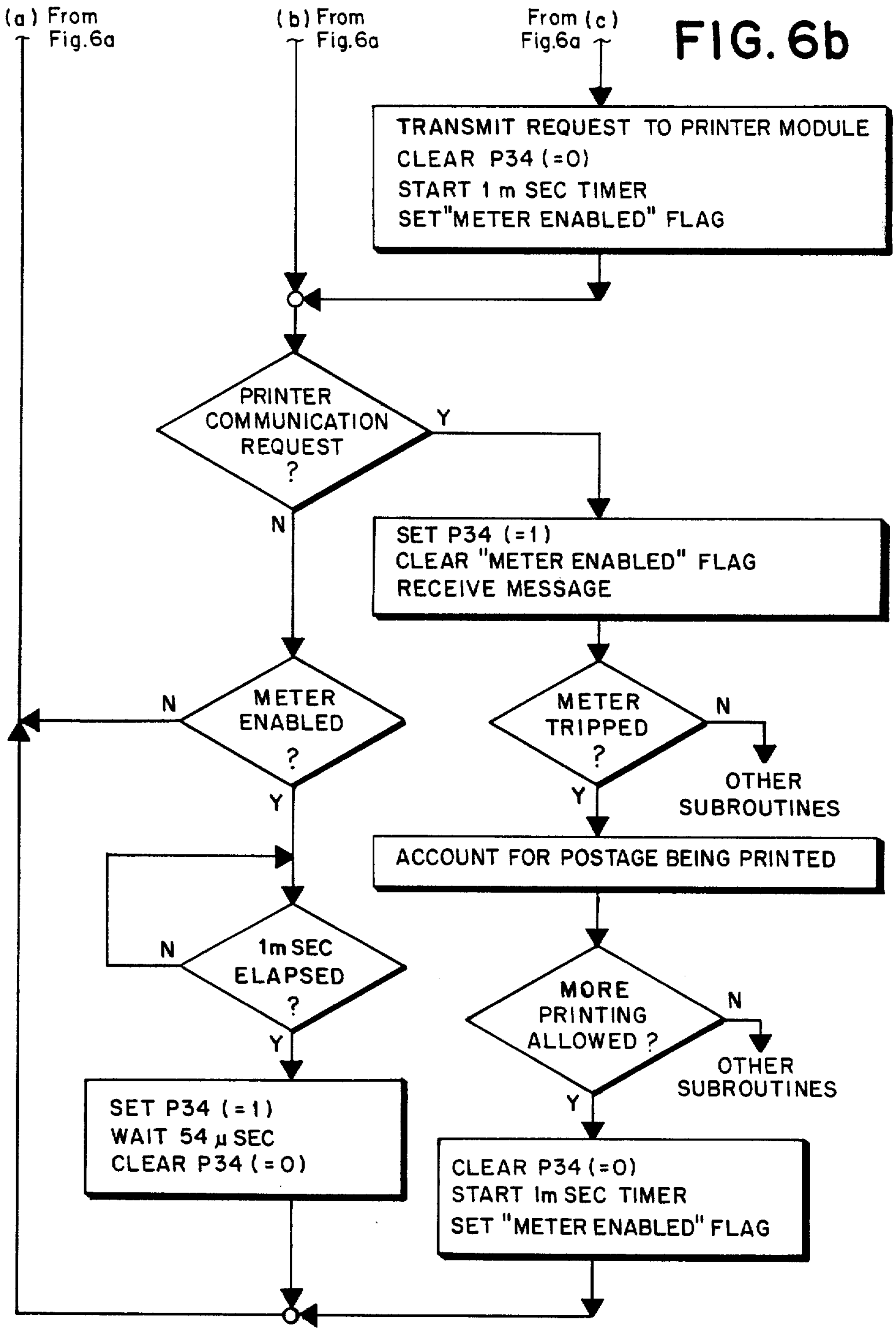
FIG. 6 is a flow chart of program for implementing control of the apparatus of FIGS. 3 and 4.

As shown in FIG. 4, to facilitate maintenance of the accounting module 501*b*, the module's logic components may be mounted on a separate printed circuit board which is removably interconnected with the postage meter's analog components by means of a conventional connector located along the dot-dash line 600. To provide the accounting module 501*b* with a local 5 V D.C. source 602 and associated ground return GND, the module 501*b* preferably includes 5 V and ground leads extending therefrom for conventional interconnection to the postage meter's 5 V source 528 (FIG. 3) and associated ground return GND. Preferably, within the module 501*b* (FIG. 4) the 5 V D.C. source 602 is shunted to the associated ground rturn GND. Preferably, within the module 501*b* (FIG. 4) the 5 V D.C. source 602 is shunted to the associated ground return lead GND by a suitable filter capacitor 604. In addition, the RST, XTAL1, XTAL2, GND, Vcc and $\overline{EA}$ terminals of the microprocessor 502*b* (FIG. 4) are each utilized in the same manner as the corresponding terminals of the microprocessor 502*c* (FIG. 3), as a consequence of which the prior discussion of the latter terminals applies with equal force to the corresponding terminals of the accounting module 501*b* (FIG. 4).

As shown in FIG. 4, serial output communications from the keyboard and display module 501*a* are received via a serial input lead which is conventionally coupled to the serial input port $P3_0$f the accounting module's microprocessor 502*b* via a conventional optical-electrical isolator circuit 610, having an LED 612 and photo-responsive transistor 614, and a conventional buffer circuit 616. Thus the serial input lead of the accounting module 501*b*, which is connected to the serial output lead of the keyboard and display module 501*a*, is suitably electrically connected to the anode of the LED 612, the cathode of which is connected via a conventional resistor 618 to the ground return lead GND to the keyboard and display module 501*a*. And, the cathode of the photo-transistor 614 is connected to the module's local 5 V source 602 via a load resistor 620 and to the input of the buffer circuit 616. Accordingly, the load resistor 620 acts as a pull-up resistor for the buffer circuit 616, the output of which is connected to port $P3_0$ of the accounting module 502*b*. Port $P3_0$ is conventionally programmed for serial input communications purposes. Port $P3_1$ of the accounting module 502*b* , is conventionally programmed for serial output communications purposes and is conventionally coupled to the serial output lead of the accounting module 501*b* for connection to the serial input lead of the keyboard and display module 501*a*. Thus Port $P3_1$ is coupled to the accounting module's serial output lead via a conventional buffer circuit 630 and optical-electrical isolator circuit 632, the circuit 632 having an LED 634 and photo-responsive transistor 636. More particularly, Port $P3_1$ is conventionally connected to the input of the buffer circuit 630, the output of which is connected to the anode of the LED 634 which has its cathode connected to the accounting module's local 5 V source 602 via a suitable resistor 638. The collector of the photo-responsive transistor 636 is connected to the serial output lead of the accounting module 501*b*. And the emitter of the photo-responsive transistor 636 is connected to the ground serial communications ground return lead GND. With the foregoing arrangement the accounting module 501*b* is electrically isolated from the keyboard and display module 501*a*.

Since the foregoing discussion applies with equal force to serial communications between the accounting module 502*b* (FIG. 4) and printing module 501*c*, the structural components interconnecting the printing module serial communications leads to ports $P3_2$ and $P3_3$ of the accounting module 501*b* are respectively numbered to correspond to those interconnecting the keyboard and display module's serial communications leads to ports $P3_0$ and $P3_1$ of the accounting module 501*b*, and it is noted that ports $P3_2$ and $P3_3$ are respectively conventionally programmed for serial communications purposes and a separate ground return lead GND is associated with the serial communications lines which are connected to the printing module 501*c*.

As shown in FIG. 4, port $P3_4$ of the microprocessor 502*b* is coupled to the interposer control output lead of the printing module 501*c* by means of a series connected circuit including a conventional buffer 640 and a conventional optical-electrical isolator circuit 642 having an LED 644 and light responsive transistor 646. Thus port $P3_4$ is suitably electrically connected to the input of the buffer 640, the output of which is connected to the cathode of the LED 644 which has its anode conventionally connected via a load resistor 648 to the accounting module's local 5 V D.C. source 602. And the collector and emitter of the transistor 646 are respectively connected via the accounting module's interposer control output lead and associated ground lead to the printing module 501*c* (FIG. 3).

According to the invention, ports $P3_4$ (FIGS. 3 and 4) of the microprocessor 502*b* and 502*c* are normally programmed for continuously providing a low level output signal. In addition, one of the timer and event counters of the microprocessor 502*b* (FIG. 3) is programmed for creating an interrupt at the end of each one millisecond time period T, when the accounting routines of the microprocessor 502*b* have completed their utilization of the data corresponding to a given postage value to be printed, determined that postage is available for printing the postage value selected by the operator and otherwise conventionally authorized printing the selected postage value. In response to the interrupt, the microprocessor 502*b* will cause the low level output signal from port $P3_4$ to be switched to a high level output signal for a predetermined time interval. For a more detailed discussion of other conventional events which are ordinarily accounted for by the computer of a postage meter prior to authorizing postage printing, reference is made to U.S. Pat. No. 4,266,222, issued May 5, 1981 to Eckert, et al and assigned to the assignee of the present invention. Preferably port $P3_4$ is caused to be switched from the low level output signal to high level output signal for a time interval of 54 microseconds upon the occurrence of each interrupt, and thus once during each one millisecond time period T. Accordingly, until a given postage value which has been entered by the operator has been accounted for by the accounting module 501*b*, port $P3_4$ will output a first low logic level control signal; and after such accounting is completed, at the commencement of each one millisecond time period T, port $P3_4$ will output a second high logic level control signal of 54 microseconds duration.

In operation, the microprocessors 502*c* (FIG. 3) and 502*b* (FIG. 4) are programmed to continuously apply a high level signal to their respective ports $P3_4$ when either of the inputs of the OR gate 564 is a high level signal, the open collector-configured OR gate 564 will not conduct. As a result, the base of transistor T1 will draw current from the 5 volt source via resistor 570. Transistor T1 will thereby be caused to be driven into its conductive state, or turned on, thereby connecting the circuit from the 30 volt source through resistor 572 and the base circuit of transistor T1 to ground. Due to the base of transistor T2 being grounded via resistor 582, the transistor T2 is in its non-conductive, or turned-off, state. Assuming the input signals from the accounting and printing modules are both switched to the low level signals hereinbefore discussed, transistor T1 will be biased to cut-off. When transistor T1 is turned off, the capacitor 580 will commence being charged from the 30 V source in the circuit which includes the resistor 572 and the capacitor 580, and resistor 582 in parallel with the base-emitter circuit of transistor T2. Due to the charging current flow driving transistor T2 into its conductive state, transistor T2 will close the circuit from the postage meter's 30 volt D.C. source through the interposer solenoiate, transistor T2 will close the circuit from the postage meter's 30 volt D.C. source through the interposer solenoid 108 and the collector-emitter circuit of transistor T2 to ground, thereby energizing the solenoid 108. The solenoid 108 will continue being energized as the capacitor 580 continues to charge via the resistor 582 and additionally via the base-emitter junction of the transistor T2. When the capacitor 580 is fully charged to 30 volts, transistor T2 will be turned off. Assuming the OR gate 564 does not receive a high level pulse signal from the accounting module 501*b*, the interposer solenoid 108 will be deenergized. On the other hand, assuming the OR gate 564 receives another high level pulse signal from the accounting module 501*b*, the output of the open collector-configured OR gate 564 will be turned off and resistor 570 connected to the base of transistor T1 will cause transistor T1 to be driven to its conductive state, thereby closing the circuit from one side of the capacitor 580, through the collector-emitter circuit of transistor T1 to ground, and from the other side of the capacitor 580, through the diode 584 to ground. As a result, the capacitor 580 will be discharged during the 54 microsecond time duration of the pulse from the accounting module 501*b*. Thereafter the OR gate 564 will be turned on, and, as discussed above,the signal to the base of transistor T1 will cause transistor T1 to be turned off, thereby causing the capacitor 580 to commence another charging cycle. Since the time delay between commencing discharge of the capacitor 580 and thereafter commencing re-charging the capacitor 580 to drive transistor T2 to its conductive state, is insufficient to permit the magnetic field developed by the solenoid 108 to collapse sufficiently to deenergize the solenoid 108, the interposer solenoid 108 is continuously energized during the continuance of the periodically pulsing signal from the accounting module's microprocessor 502*b*. As a result, the interposer 104 is caused to be maintained held out of blocking engagement with the shutter bar 77, during the continuance of the pulsing signal from the accounting module 502*b*, whereby the shutter bar 77 may be withdrawn from blocking engagement with the drum drive gear 76 to permit rotation of the drum 38 for printing postage. On the other hand, upon cessation of the intermittent high level signal from port $P3_4$ of the accounting module's microprocessor 502*b*, the capacitor 580 will become fully charged and remain fully charged as a result of transistor T2 remaining turned off, thereby permitting collapse of the interposer solenoid's magnetic field, with the result that the interposer 104 will again be urged into blocking relationship with respect to the shutter bar 77 to prevent rotation of the drum 38.

With the above described arrangement of apparatus a high level input to the OR gate from either microprocessor 502*b* or 502*c*, independently of the other microprocessor 502*b* or 502*c*, will cause the solenoid to be deenergized and thus prevent postage from being printed. And, if for any reason the accounting module fails to account for the postage to be printed or otherwise improperly operates, the liklihood of printing postage is substantially non-existent due to the highly unlikely possibility of spurious signals being timely generated at both ports $P3_4$ of the microprocessor 502*b* and 502*c* for permitting postage to be printed.

The term postage meter as used herein includes any device for imprinting a value or other indicia on a sheet or sheet like material for governmental or private carrier parcel, envelope, packagenting a value or other indicia on a sheet or sheet like material for governmental or private carrier parcel, envelope, package delivery purposes or for other printing purposes. For example, private parcel or freight services purchase and employ postage meters for providing unit value pricing on tape for application on individual parcels.

Although the invention disclosed herein has been described with reference to a simple embodiment thereof, variations and modifications may be made therein by persons skilled in the art without departing from the spirit and scope of the invention. Accordingly, it is intended that the following claims cover the disclosed invention and such variations and modifications thereof as fall within the true spirit and scope of the invention.

What is claimed is:

1. In an electronic postage meter having computer means and for printing a postage value, wherein the computer means includes means for authorizing printing the postage value, and said postage meter having shutter means operable for alternately preventing and permitting operation of said postage printing means, and having interposing means operable for alternately preventing and permitting operation of said shutter means, an improvement for controlling operation of said interposing means, said improvement comprising:

(a) said computer means including means for generating a first control signal for normally operating said interposing means to prevent operation of said shutter means;

(b) said computer means including means for generating a second control signal when said authorizing means has authorized printing the postage value, said second control signal comprising a series of pulses during a cycle of printing of postage value for operating said interposing means to permit operation of said shutter means; and (c) means for coupling said first and second control signals to said interposing means for controlling operation thereof.

2. The improvement according to claim 1, wherein said coupling means includes a first stage amplifying circuit and a second stage amplifying circuit, and said coupling means including a capacitor for coupling said first stage amplifying circuit to said second stage amplifying circuit.

3. The improvement according to claim 3, including said second control signal connected for driving said first stage amplifying circuit, said capacitor charging during the time period between successive pulses and discharging during the time interval of duration of the respective pulses, said interposing means being operated by said second stage amplifying circuit to permit operation of said shutter means during the capacitor charging time period, and said discharging time interval being sufficiently small to permit continuous operation of said shutter means.

4. The improvement according to claim 1, wherein each of said pulses has a predetermined magnitude and time duration, an each of said pulses is generated upon the commencement of a predetermined time period.

5. The improvement according to claim 1, wherein said computer means includes an accounting module, said accounting module including said means for authorizing printing the postage value, and said accounting module includes said means for generating said second control signal, whereby said accounting module controls timely operation of said interposing means.

6. In an electronic postage meter having computer means and means operable for printing a postage value, wherein said computer means includes means for authorizing printing of said postage value, and said postage meter having shutter means operable for normally preventing operation of said postage printing means, and having interposing means including an interposer and a solenoid, wherein said solenoid is operable for causing said interposer to alternately prevent and permit operation of said shutter means, an improvement for controlling operation of the solenoid, said improvement comprising:

(a) means for generating a first control signal for normally operating said solenoid to prevent operation of said shutter means;

(b) means for generating a second control signal for operating said solenoid to permit operation of said shutter means, said second control signal being generated when said authorizing means has authorized printing the postage value, and said second control signal is a series of periodically generated pulses during a printing cycle, each pulse having a predetermined time duration.

7. The improvement according to claim 6, including means for coupling said first and second control signals to said solenoid.

8. The improvement according to claim 7, wherein said computer means includes a printing module, and said printing module includes said means for generating said first control signal.

9. The improvement according to claim 7, wherein said computer means includes an accounting module, and said accounting module includes said means for generating said second control signal upon completion of accounting for said postage value.

10. The improvement according to claim 7, wherein said coupling means includes first stage amplifier means and second stage amplifier means, said coupling means including a capacitor for coupling said first stage amplifier means to said second stage amplifier means, said computer means driving said first stage amplifier means, and said second stage amplifier means driving said solenoid.

11. The improvement according to claim 10, wherein said computer means includes an accounting module and a printing module, said printing module including said means for generating said first control signal, said accounting module including said means for generating said second control signal upon completion of accounting for said postage value, and said printing module including said coupling means.

12. The improvement according to claim 7, wherein said computer means includes said means for generating said first control signal and means for generating said second control signal.

13. The improvement according to claim 8, wherein said printing module includes said coupling means.

* * * * *

UNITED STATES PATENT AND TRADEMARK OFFICE
CERTIFICATE OF CORRECTION

PATENT NO. : 4,731,728
DATED : March 15, 1988
INVENTOR(S) : Arno Muller

It is certified that error appears in the above—identified patent and that said Letters Patent is hereby corrected as shown below:

Column 5, lines 61-63, delete "The microprocessor 502, generally able from Intel Corporation, 3065 Bowers Avenue, Santa Clara, California 95051."

Column 8, line 22, change "rturn" to --return--.

Column 8, line 36, change "$P3_0f$" to --$P3_0$ of--.

Column 10, lines 27-30, delete "solenoiate, transistor T2 will close the circuit from the postage meter's 30 volt D.C. source through the interposer".

Column 11, lines 28-30, delete "packagenting a value or other indicia on a sheet or sheet like material for governmental or private carrier parcel, envelope,".

Column 12, line 20, change "an" to --and--.

Signed and Sealed this

Thirteenth Day of December, 1988

*Attest:*

DONALD J. QUIGG

*Attesting Officer*

*Commissioner of Patents and Trademarks*